United States Patent

[11] 3,619,498

[72] Inventor Dong Woo Rhee
Williamsville, N.Y.
[21] Appl. No. 822,787
[22] Filed Apr. 1, 1969
[45] Patented Nov. 9, 1971
[73] Assignee Sylvania Electric Products, Inc.

[54] KEYED AUTOMATIC GAIN CONTROL CIRCUITRY
10 Claims, 2 Drawing Figs.

[52] U.S. Cl. 178/7.3 DC
[51] Int. Cl. H04n 5/56
[50] Field of Search 178/7.3 DC, 7.3 E, 7.3 S, 7.5 DC, 7.5 E, 7.5 S

[56] References Cited

UNITED STATES PATENTS

| | | | |
|---|---|---|---|
| 2,654,799 | 10/1953 | Wendt | 178/7.5 DC |
| 3,301,951 | 1/1967 | Humphrey | 178/7.3 DC |
| 3,531,590 | 9/1970 | Jachim | 178/7.5 DC |
| 3,038,026 | 7/1952 | Mothersole | 178/7.3 DC |
| 3,182,122 | 5/1965 | Kao | 178/7.3 S |
| 3,207,844 | 9/1965 | Massman | 178/7.3 S |
| 3,320,362 | 5/1967 | Shimada et al. | 178/7.3 DC |
| 3,432,615 | 3/1969 | Stamatis | 178/7.3 DC |

*Primary Examiner*—Robert L. Griffin
*Assistant Examiner*—John C. Martin
*Attorneys*—Norman J. O'Malley, Donald R. Castle and Thomas H. Buffton

ABSTRACT: A signal receiver includes gated automatic gain control (AGC) circuitry having an amplifier stage coupled by a first unidirectional conduction device to a gate pulse signal source and by a second unidirectional conduction device to RF and IF amplifier stages whereby the first unidirectional conduction device prevents ringing in the gate pulse signal source from affecting the AGC action and the second unidirectional conduction device tends to sustain a substantially constant level of AGC signal intermediate the period of gated pulse signal application.

PATENTED NOV 9 1971 3,619,498

SHEET 1 OF 2

INVENTOR.
DONG W. RHEE

BY

Donald R. Castle

ATTORNEY

INVENTOR.
DONG W. RHEE

BY
Donald R. Castle
ATTORNEY

KEYED AUTOMATIC GAIN CONTROL CIRCUITRY

BACKGROUND OF THE INVENTION

Generally, television receivers and similar apparatus respond to a wide range of intercepted signals and it is desirable to provide an output signal at a substantially constant magnitude despite this variation in received signals. The most usual way of effecting this substantially constant level of output signal is to employ an AGC loop wherein the received signal is utilized to develop a feedback signal which is coupled back into the circuitry in phase opposition to the received signals. In other words, negative feedback signals are frequently employed to control the gain of a number of amplifier stages.

Normally, television receivers employ a signal system which responds to blanking pulses occurring at a horizontal scan frequency. Moreover, these blanking pulses include a black-level portion having a substantially fixed magnitude with respect to the received signal and a synchronizing pulse signal portion which is also substantially fixed in magnitude with respect to the black-level portion of the blanking pulses. Thus, the black-level portion and the synchronizing pulse signal portion of the blanking pulse signals are frequently employed as a reference for controlling the gain of the television receiver.

Also, television receiver AGC systems are usually "gated" to effect operation thereof only during the period of an applied blanking pulse signal. In this manner, the AGC system is inoperative at all periods other than the gated period and undesired noise signals occurring during this inoperative period have substantially no deleterious effect upon the AGC system.

Further, a flyback pulse signal developed from a separate winding on the flyback transformer of the television receiver is frequently employed to gate the AGC system. However, it has been found that such flyback pulse signals often include so-called "ringing" which tends to deleteriously effect the action of the AGC system.

Additionally, it has been found that the flyback pulse signals employed to gate the AGC system occur at the horizontal scan frequency which leaves a considerable period of time intermediate the pulse signals during which time the potential developed by the AGC system tends to deteriorate. Thus, it becomes important to inhibit potential deterioration of the AGC system during the period intermediate the application of the pulse signals.

OBJECTS AND SUMMARY OF THE INVENTION

An object of the present invention is to enhance gated automatic-gain-control (AGC) circuitry for a television receiver. Another object of the invention is to provide an AGC system having an improved response to signals during the gating period. Still another object of the invention is to provide an improved AGC system having enhanced operation intermediate periods of gating.

These and other objects, advantages, and capabilities are achieved in one aspect of the invention by an automatic-gain-control system having an electron device coupled to a video signal source, by a first unidirectional conduction device and charging network to a gating pulse signal source, and by a second unidirectional conduction device to RF and IF-amplification stages of a receiver.

DESCRIPTION OF THE PREFERRED EMBODIMENT

For a better understanding of the present invention, together with other and further objects, advantages and capabilities thereof, reference is made to the following disclosure and appended claims in connection with the accompanying drawings.

Figure 1:
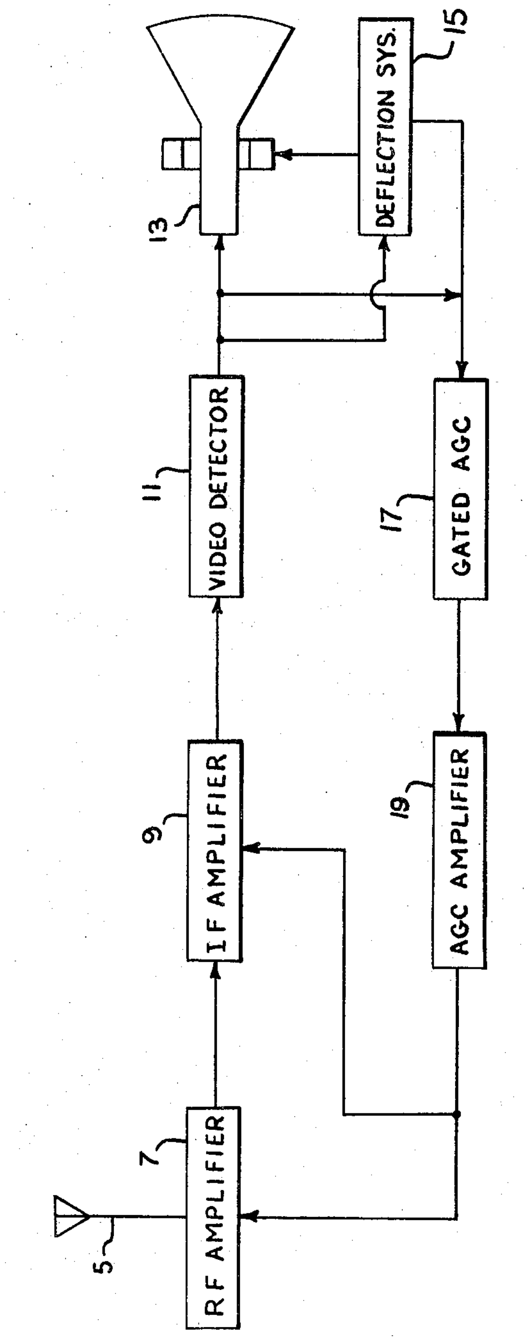
FIG. 1 is a block diagram of a television receiver wherein the present invention may be employed.

Referring to the drawings, FIG. 1 illustrates a typical receiver wherein modulated RF signals are intercepted by an antenna 5 and applied to an RF amplifier stage 7. In the RF amplifier stage 7 the RF signals are heterodyned to provide IF signals which are applied to the IF amplifier stage 9. In turn, the IF signals are applied to a video detector stage 11 wherein the carrier signals are removed and the output signals applied to a cathode-ray tube 13 and to a deflection system 15 coupled to the cathode ray tube 13.

Also, the signal from the video detector stage 11 is applied to a gated automatic-gain-control (AGC) stage 17 and the deflection system 15 serves to provide a pulse signal source wherefrom a signal is also applied to the gated AGC stage 17. The gated AGC stage 17 is, in turn, coupled by way of an AGC amplifier stage 19 to the RF amplifier stage 7 and the IF amplifier stage 9 of the receiver. Thus, the gated AGC stage 17 and the AGC amplifier stage 19 serve to provide a feedback loop for controlling the gain of the RF and IF amplifier stages 7 and 9 to effect an output of the video detector stage 11 of substantially constant magnitude even though the received RF signals at the antenna 5 are of varying magnitude.

Figure 2:
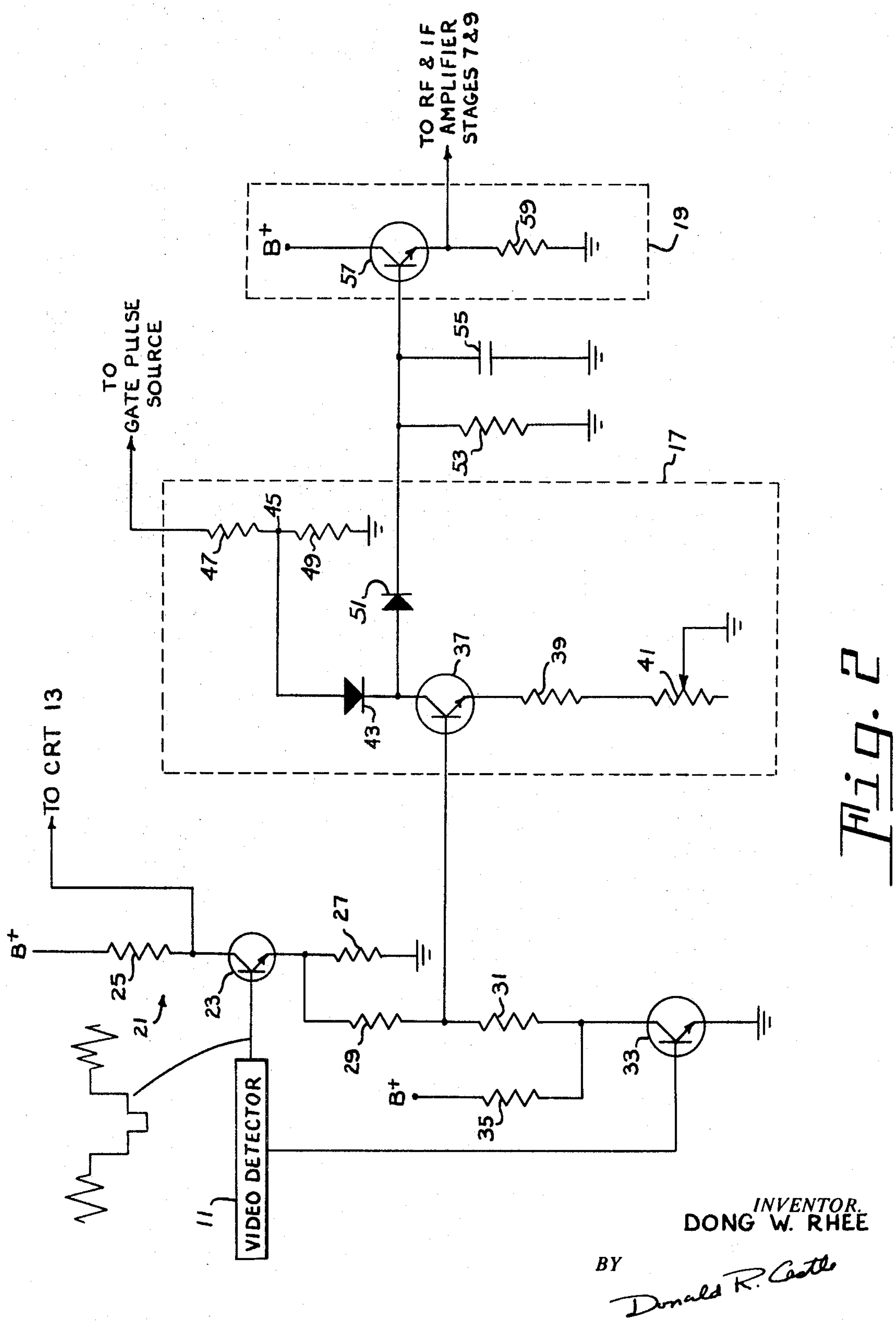
FIG. 2 is an illustration of a preferred form of gated automatic-gain-control (AGC) circuitry.

Referring to the schematic illustration of FIG. 2, the video detector stage 11 is coupled to a video amplifier stage 21. This amplifier stage 21 includes a transistor 23 having a collector coupled by a resistor 25 to a potential source B+ and to the cathode-ray tube 13. The emitter is coupled to circuit ground by a resistor 27 and by way of series connected resistors 29 and 31 and a noise-gate transistor 33 to circuit ground. The noise-gate transistor 33 has a base coupled back to the video detector stage 11 and a collector coupled by a resistor 35 to a potential source B+.

Coupled to the junction of the series-connected resistors 29 and 31 is a gated AGC stage 17. This gated AGC stage 17 includes a transistor 37 having an input or emitter electrode coupled by way of a series-connected fixed resistor 39 and an adjustable resistor 41 to a potential reference level. The base or control electrode of the transistor 37 is coupled to the junction of the series-connected resistors 29 and 31. The output or collector electrode of the transistor 37 is coupled by way of a first unidirectional conduction device 43 to the junction 45 of a pair of resistors 47 and 49 series connected intermediate a gating pulse signal source and a potential reference level such as circuit ground. Also, the output or collector electrode of the transistor 37 is coupled to a second unidirectional conduction device 51.

This second unidirectional conduction device 51 is coupled to circuit ground by a parallel connected resistor 53 and a capacitor 55 and to the base of a transistor 57 in an AGC amplifier stage 19. The collector of the transistor 57 is coupled to a potential source B+ while the emitter is coupled by way of a resistor 59 to circuit ground and to the RF and IF amplifier stages 7 and 9 respectively.

As to operation, the video-detector stage 11 provides a negative-going video signal which includes a blanking pulse signal having a black-level portion and a synchronizing pulse signal portion with the blanking pulse signal occurring at a horizontal scan frequency. The negative-going video signal is applied to the video amplifier stage 21 wherein an amplified positive-going signal is developed and applied to the cathode-ray tube 13. Also, the video amplifier stage 21 serves in the manner of an emitter-follower stage whereby the negative-going video signal is applied via the resistor 29 to the base or control electrode of the transistor 37 of the gated AGC stage 17.

Also, the negative-going video signal from the video detector stage 11 is applied to the base of the noise-gate transistor 33. Should this video signal include high-peak noise signals, the noise-gate transistor 33 which is normally in a "saturated" conduction state will be rendered less conductive by the noise signals causing development of a positive-going pulse signal at the collector or output electrode of the noise-gate transistor 33. In turn, this positive-going pulse is applied via the resistor 31 to the base of the transistor 37 of the gated AGC stage 17. This positive-going pulse signal will arrive at the same time as negative-going noise signal from the video detector stage 11 via the resistor 29, whereupon noise signals from the video-detector stage 11 are substantially eliminated or at the very least reduced in a manner such that the gated AGC stage 17 is substantially unaffected thereby.

In time coincidence with the arrival of a negative-going blanking pulse video signal at the base of the transistor 37 of the gated AGC stage 17, a positive-going pulse signal from a gating pulse signal source is applied via the series-connected resistors 47 and 49 and the first unidirectional conduction device 43 to the collector of the transistor 37. Thus, the applied gating pulse signal renders the gated AGC stage 17 operative at the time the negative-going blanking pulse video signal is applied thereto whereupon an amplified blanking pulse signal is applied to the second unidirectional conduction device 51.

It should perhaps be noted at this point that the gating signal provided by the gating pulse signal source can be in one of several forms. For instance, a horizontal flyback pulse signal available from the horizontal output stage of a television receiver is a preferred form of gating signal. Moreover, the fact that horizontal flyback pulse signals usually include ringing signals which tend to include negative-going portions with respect to the positive-going pulse signal is rendered substantially immaterial insofar as the gated AGC stage 17 is concerned because of the first unidirectional conduction device 43 which responds in a nonconductive manner to negative-going signals. Thus, the gated AGC stage 17 is rendered operative by the positive-going horizontal flyback pulse signal and substantially unaffected by any ringing signals included therewith, because of the first unidirectional conduction device 43. Obviously, the first unidirectional conduction device 43 is unnecessary when ringing or negative-going signals are not present.

Further, it should also be noted that the gating signal provided by the gating pulse signal source may be in the form of a color-burst-gating signal occurring during the black-level portion of the blanking pulse signals. Thus, numerous forms of gating signals are appropriate so long as application thereof occurs during the period of applied blanking pulse video signals. Thereafter, the amplified blanking pulse signal applied to the second unidirectional conduction device 51 is directly coupled to the AGC amplifier stage 19 and to a parallel connected resistor 53 and capacitor 55 coupled intermediate the junction of the second unidirectional conduction device 51 and the AGC amplifier stage 19 and circuit ground. In turn, the AGC amplifier stage 19 is fed back to control the signal gain of the RF and IF amplifier stages 7 and 9 respectively of the television receiver.

It should perhaps be noted that the capacitor 55 tends to act as a storage device for the amplified blanking pulse signals and serves to provide a relatively steady level of DC potential since the time constant of the circuitry, as determined by the resistor 53, capacitor 55, and the input of the AGC amplifier stage 19, is greater than the horizontal scan period. Also, the second unidirectional conduction device 51 serves to prevent undesired discharge of the potential of the capacitor 55 by way of the transistor 37 of the gated AGC stage 17. Thus, a potential is stored by the capacitor 55 to effect application of a substantially constant potential to the AGC amplifier stage 19 intermediate gating periods of the gated AGC stage 17. Moreover, the positive charge of the capacitor 55 back-biases the second unidirectional conduction device 51 whereupon undesired discharge of the potential of the capacitor 55 by way of the transistor 37 is prevented.

Thus, there has been provided a unique gated type AGC system finding utility in television receivers. The system is uncomplicated and inexpensive in components and construction and readily adapted to various forms of noise-gating circuitry. Further, the system provides AGC action substantially immune from undesired variations due to oppositely going gating pulse signals. Moreover, numerous sources of gating pulse signals are readily applicable to the system and the system includes means for sustaining an output signal which is substantially constant intermediate gating periods of the AGC system.

While there has been shown and described what is at present considered the preferred embodiments of the invention, it will be obvious to those skilled in the art that various changes and modifications may be made therein without departing from the invention as defined by the appended claims.

I claim:

1. In a television receiver having radio frequency (RF) and intermediate frequency (IF) signal amplification stages, a gated automatic-gain-control (AGC) circuit comprising:
- video signal source means providing a blanking pulse signal occurring at a horizontal scan frequency;
- gating pulse signal source means providing a gating pulse signal occurring at a horizontal scan frequency and in coincident time relationship with said blanking pulse signal;
- charging network means including capacitor means coupled to a potential reference level; and
- automatic gain control means including an electron device having an input electrode coupled to a potential reference level, a control electrode coupled to said video signal source means, and an output electrode DC coupled to said gating pulse signal source means and DC coupled by a unidirectional conduction device to said capacitor means of said charging network means to cause development of DC potentials for application to said radio frequency (RF) and intermediate frequency (IF) signal amplification stages of said receiver whereby increasing and decreasing received signals cause increasing and decreasing bias potentials reducing and increasing the signal gain of said RF and IF signal amplification stages.

2. The combination of claim 1 wherein said gating pulse signal available from said gating pulse signal source means is in the form of a horizontal flyback pulse.

3. The combination of claim 1 wherein said gating pulse signal available from said gating pulse signal means is in the form of color-burst-gating signals occurring during said black-level portion of said blanking pulse signal from said video signal source means.

4. The circuit of claim 1 including an adjustable impedance coupling said input electrode of said AGC means to said potential reference level whereby gain of said AGC means is controlled.

5. In a television receiver having radio frequency (RF) and intermediate frequency (IF) signal amplifier stages a gated automatic-gain-control (AGC) circuit comprising:
- automatic-gain-control (AGC) means;
- video signal source means coupled to said AGC means;
- gating pulse signal source means;
- charging network means including a parallel connected capacitor and impedance coupled to a potential reference level;
- first diode means DC coupling said gating pulse signal source means to said AGC means; and
- second diode means DC coupling said AGC means and said first diode means to said charging network means to cause development of DC potentials for application to said RF and IF amplifier stages of said receiver.

6. The combination of claim 5 wherein said AGC means is in the form of a transistor having an emitter coupled to a potential reference level, a control electrode coupled to said video signal source means, and a collector coupled by said first diode means to said gating pulse signal source means and said second diode means to said RF and IF amplifier stages of said receiver.

7. The combination of claim 5 including an amplifier stage coupling said second diode means and a charging network to said RF and IF amplifier stages.

8. The combination of claim 5 wherein said gating pulse signal source means provides flyback pulse signals at a horizontal scan frequency.

9. The combination of claim 5 wherein said gating pulse signal source means provides color-burst-gating signals at a horizontal scan frequency.

10. The circuit of claim 5 including an adjustable impedance coupling said AGC means to a potential reference level whereby variations of said adjustable impedance effect variation in gain of said AGC means.

* * * * *